(12) United States Patent
Hao et al.

(10) Patent No.: US 10,769,948 B2
(45) Date of Patent: Sep. 8, 2020

(54) PARKING SPOT DETECTION SYSTEM AND METHOD THEREOF

(71) Applicant: Industrial Technology Research Institute, Hsinchu (TW)

(72) Inventors: Yu-Hsiang Hao, Taoyuan (TW);
Wen-Han Lu, Chiayi County (TW);
Chia-Jui Hu, New Taipei (TW);
Tse-Lin Lee, New Taipei (TW);
Yu-Syuan Liao, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/233,109

(22) Filed: Dec. 27, 2018

(65) Prior Publication Data

US 2020/0211389 A1 Jul. 2, 2020

(51) Int. Cl.
*G08G 1/14* (2006.01)
*G01C 21/30* (2006.01)

(52) U.S. Cl.
CPC ............. *G08G 1/141* (2013.01); *G01C 21/30* (2013.01)

(58) Field of Classification Search
CPC ................................ G08G 1/141; G01C 21/30
See application file for complete search history.

(56) References Cited

U.S. PATENT DOCUMENTS

| 8,885,889 B2 | 11/2014 | Park et al. |
| 2015/0339924 A1 | 11/2015 | Cook et al. |
| 2016/0221495 A1* | 8/2016 | Cunningham, III ... B60Q 1/488 |
| 2016/0343139 A1* | 11/2016 | Diegmann ............. H04N 7/181 |
| 2017/0043808 A1 | 2/2017 | Yang |
| 2017/0294121 A1* | 10/2017 | Jain .......................... G08G 1/14 |
| 2018/0135972 A1* | 5/2018 | Patel ...................... B60K 35/00 |
| 2018/0211539 A1* | 7/2018 | Boss ...................... G08G 1/168 |

(Continued)

FOREIGN PATENT DOCUMENTS

| CN | 103907147 | 7/2014 |
| CN | 103473950 | 4/2017 |
| CN | 107170033 | 9/2017 |

(Continued)

OTHER PUBLICATIONS

Pieter Abbeel et al., "Apprenticeship Learning for Motion Planning with Application to Parking Lot Navigation," 2008 IEEE/RSJ International Conference on Intelligent Robots and Systems, Sep. 22-26, 2008, pp. 1-8.

(Continued)

*Primary Examiner* — Mohamed Barakat
(74) *Attorney, Agent, or Firm* — JCIPRNET (57) ABSTRACT

A parking spot detection system is provided with a detection unit, a map database and a processing unit. The detection unit acquires position data and intensity data of a plurality of data points in an environment space. The map database provides map information. The processing unit is coupled to the detection unit and the map database and determines whether a geometric shape formed by adjacent data points is of a parking space according to the intensity data of the data points; and if the geometric shape is determined to be of the parking space, the processing unit further integrates the geometric shape and the position of the parking space into the map data according to the position data of the data points.

16 Claims, 4 Drawing Sheets

(56) References Cited

U.S. PATENT DOCUMENTS

2018/0239968 A1* 8/2018 Gupta .............. G06K 9/00798
2018/0308364 A1* 10/2018 Kume ................... B60R 21/00

FOREIGN PATENT DOCUMENTS

| CN | 107192994 | 9/2017 |
| TW | 201024664 | 7/2010 |
| TW | 201826231 | 7/2018 |

OTHER PUBLICATIONS

Lihua Tong et al., "Integration of LiDAR Data and Orthophoto for Automatic Extraction of Parking Lot Structure," IEEE Journal of Selected Topics in Applied Earth Observations and Remote Sensing, vol. 7, No. 2, Feb. 2014, pp. 503-514.

Soren Kammel et al., "Lidar-based lane marker detection and mapping," 2008 IEEE Intelligent Vehicles Symposium, Jun. 4-6, 2008, pp. 1137-1142.

Weng et al., "Road-traffic-sign Detection from Mobile LiDAR Point Clouds," Journal of Xiamen University (NaturalScience), vol. 55, Issue 4, Jul. 2016, pp. 580-585.

Yi-No Lien, "The Extraction of Road Regions and Road Marks from Mobile Lidar Point Clouds based on Knowledge of Road", Thesis of Master Degree, NCTU, Jul. 2013, pp. 1-89.

Yiming Xu et al., "Road Marking Survey with Mobile Lidar System," 30st Florida Conference on Recent Advances in Robotics, May 11-12, 2017, pp. 1-4.

"Notice of Allowance of Taiwan Counterpart Application," dated Dec. 17, 2019, p. 1-p. 3.

* cited by examiner

PARKING SPOT DETECTION SYSTEM AND METHOD THEREOF

BACKGROUND

1. Technical Field

The present disclosure relates to a detection technology and particularly relates to a parking spot detection system and method.

2. Description of Related Art

When a vehicle enters a place for parking, a driver of the vehicle cannot immediately know whether the place has a parking spot suitable for the vehicle. The driver usually needs to drive around a couple of times before finding the suitable parking spot. Therefore, how to quickly provide information of the suitable parking spot for the driver is a problem that needs to be solved by personnel in the art.

SUMMARY

The present disclosure provides a parking spot detection system and method which are capable of integrating parking spot information into a map to automatically find a suitable parking spot.

The present disclosure provides a parking spot detection system which is provided with a detection unit, a map database and a processing unit. The detection unit acquires position data and intensity data of a plurality of data points in an environment space. The map database provides map data. The processing unit is coupled to the detection unit and the map database and determines whether a geometric shape formed by adjacent data points is of a parking space according to the intensity data of the data points; and if the geometric shape is determined to be of the parking space, the processing unit further integrates the geometric shape and a position of the parking space into the map data according to the position data of the data points.

The present disclosure provides a parking spot detection method which comprises the following steps: acquiring position data and intensity data of a plurality of data points in an environment space; determining whether a geometric shape formed by adjacent data points is of a parking space according to the intensity data of the data points; and if the geometric shape is determined to be of the parking space, integrating the geometric shape and a position of the parking space into the map data according to the position data of the data points.

Based on the above, the parking spot detection system and method of the present disclosure can detect a parking space and integrate the detected parking space into a map.

In order to make the aforementioned and other objectives and advantages of the present invention comprehensible, embodiments accompanied with figures are described in detail below.

DESCRIPTION OF THE EMBODIMENTS

Figure 1:
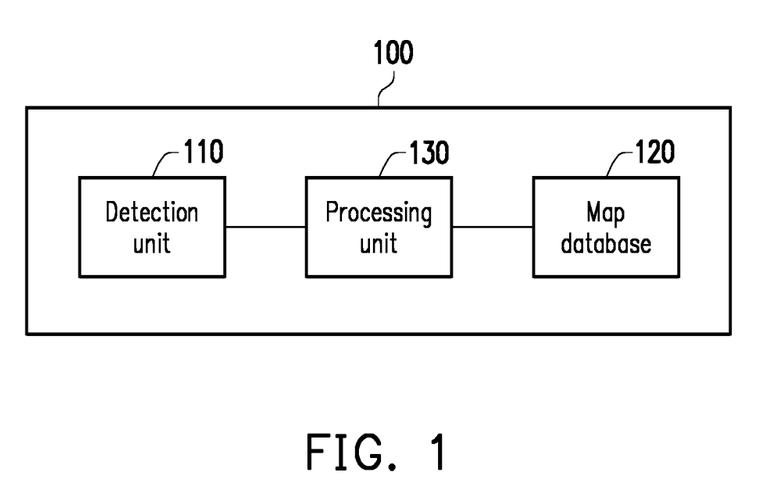
FIG. 1 shows a schematic diagram of a parking spot detection system according to an embodiment of the present disclosure.

FIG. 1 shows a schematic diagram of a parking spot detection system according to an embodiment of the present disclosure. Referring to FIG. 1, a parking spot detection system 100 is provided with a detection unit 110, a map database 120 and a processing unit 130.

The detection unit 110 is used for sensing related information of a surface of each object in an environment space. Specifically, the detection unit 110 senses position data and intensity data of the environment space, and shows position data and intensity data corresponding to each object in the form of data points. For example, in the present embodiment, the detection unit 110 is a lidar (light detection and ranging). The lidar emits a plurality of light signals (such as laser light) around, and each light signal extends to the far side in the environment space and the surface of each object. Thus, based on the intensity of the signal obtained by return of each light signal which is actively or passively excited in the space, the lidar acquires position data and intensity data corresponding to each data point in the space. A three-dimensional space in the environment space can be established based on the intensity data corresponding to each piece of position data.

The map database 120 provides map information. For example, the map database 120 can be realized by various types of navigation devices and vehicle-mounted devices, but the present disclosure is not limited thereto. In the embodiment of the present disclosure, the map data is an HD map (High Definition Map). The HD map can provide information such as current longitude and latitude, height and course angle of the vehicle, so as to provide more detailed driving and road information. The HD map can be understood by those of ordinary skill in the art and is not described in detail herein.

The processing unit 130 is coupled to the detection unit 110 and the map database 120 and is used for executing various types of operations in the parking spot detection system 100. For example, the processing unit 130 is a central processing unit (CPU), or other programmable general-purpose or special-purpose microprocessor, digital signal processor (DSP), programmable controller, application-specific integrated circuit (ASIC) or other similar elements or a combination of the elements, but the present disclosure is not limited thereto.

Figure 2:
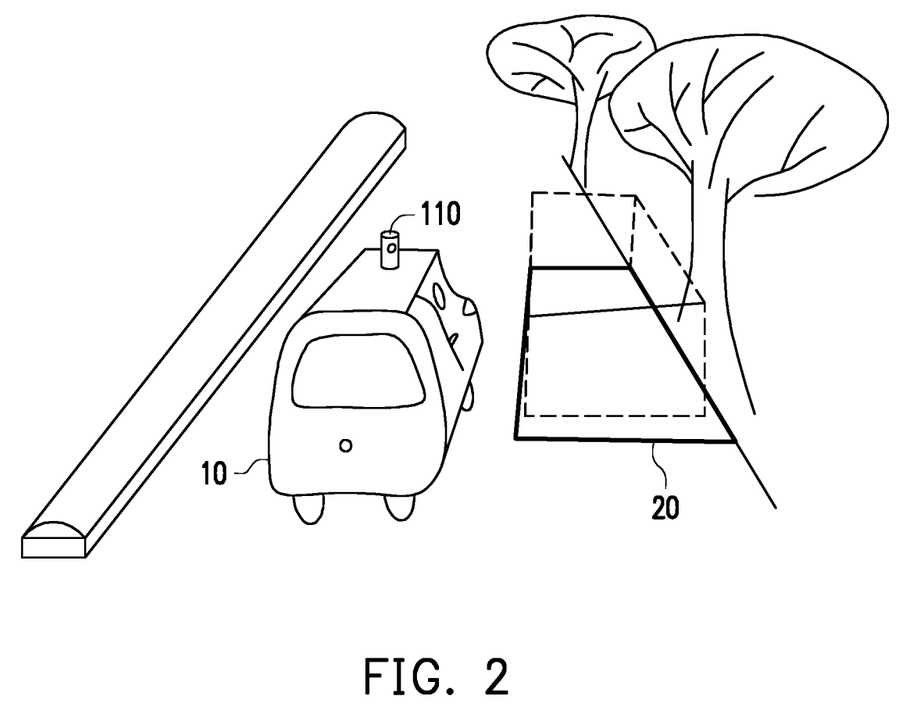
FIG. 2 shows a schematic diagram of a scenario of a parking spot detection system according to an embodiment of the present disclosure.

FIG. 2 shows a schematic diagram of a scenario of a parking spot detection system according to an embodiment of the present disclosure. Referring to FIG. 2, the scenario as shown in FIG. 2 corresponds to the parking spot detection system as shown in FIG. 1. In the present embodiment, the detection unit 110 is arranged above the vehicle 10 to detect the environment space. However, the present disclosure does not limit the mounting position of the detection unit 110 on the vehicle 10. In addition, when the parking spot detection system 100 operates, the vehicle 10 can be in a moving state. In other words, the parking spot detection system 100 continuously operates while moving and repeatedly detects a parking spot 20.

It should be noted that in one application scenario of the present disclosure, the detection unit 110 not only can determine whether the surrounding environment has a plane position capable of containing the vehicle 10, but also can further determine whether the height in the plane position can contain the vehicle 10 after finding the plane position space capable of containing the vehicle 10. For example, in a scenario of roadside parking in FIG. 2, if the branches and leaves of a tree are quite dense and are lower than the height of the vehicle 10, the vehicle 10 hits the branches and leaves when the vehicle 10 is parked in the parking spot 20. In other words, the branches and leaves of the tree have a height limitation to the parking spot 20. At this moment, the detection unit 110 can detect the condition that obstacles exist above the parking spot 20, thereby excluding the parking spot 20. In another scenario of the present disclosure, if the vehicle 10 enters a basement, at this moment, the detection unit 110 detects whether an obstacle exists above the plane position space capable of containing the vehicle 10, for example, whether the vehicle 10 cannot be parked due to the height limitation of a floor height, a mechanical parking spot and the like, thereby finding the parking spot suitable for the vehicle 10. Detailed processes refer to the illustration below.

Figure 3:
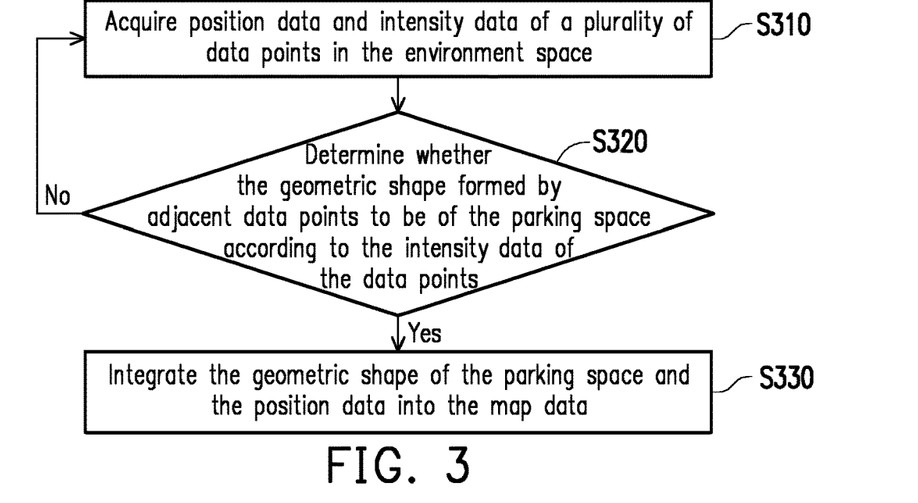
FIG. 3 shows a schematic flowchart of a parking spot detection method according to an embodiment of the present disclosure.

FIG. 3 shows a schematic flowchart of a parking spot detection method according to an embodiment of the present disclosure. Referring to FIG. 3, the parking spot detection method is at least suitable for the parking spot detection systems 100 according to the embodiments in FIG. 1 and FIG. 2. The operating processes of the parking spot detection system 100 and the parking spot detection method of the present disclosure are illustrated simultaneously according to FIG. 1 to FIG. 3 below.

In step S310, the detection unit 110 acquires position data and intensity data of a plurality of data points in the environment space.

In step S320, the processing unit 130 determines whether the geometric shape formed by adjacent data points is of the parking space according to the intensity data of the data points.

Specifically, the detection unit 110 transmits a signal into the environment space and receives a signal returned on each piece of position data. The position data is a coordinate value divided by the processing unit 130 according to the environment space. For example, the processing unit 130 can record the position data of each data point by adopting but not limited to a rectangular coordinate system. Any method capable of being used for marking the space position can be applied to the present disclosure. Furthermore, because the intensity of the returned signal is inconsistent due to the distance between the obstacle and the signal and the material of the obstacle, the processing unit 130 can further establish a three-dimensional space of the corresponding environment space according to the intensity data returned in each piece of position data. For example, in one embodiment of the present disclosure, the returned signal intensity data difference between the position data corresponding to an asphalt road and the position data corresponding to a pavement marking is about 30%, but the present disclosure is not limited thereto.

Particularly, the processing unit 130 considers adjacent data points with similar intensity data as a geometric shape according to the intensity data of the data points, and the geometric shape may be a triangle, a quadrangle or graphs in any different shapes. However, the processing unit 130 determines whether the geometric shape is of the parking space only when the shape and size of the geometric shape conform with the features and size of the parking space. The specific details are further illustrated later.

In step S330, the processing unit 130 integrates the geometric shape of the parking space and the position data into the map data.

In detail, in the embodiment of the present disclosure, the map data is an HD map. Furthermore, the processing unit 130 can clearly know an obstacle in each position in the three-dimensional space established according to the position data and the intensity data. Therefore, the processing unit 130 can integrate the geometric shape of the parking space and mark that the geometric shape is of the parking space in the map data.

Figure 4:
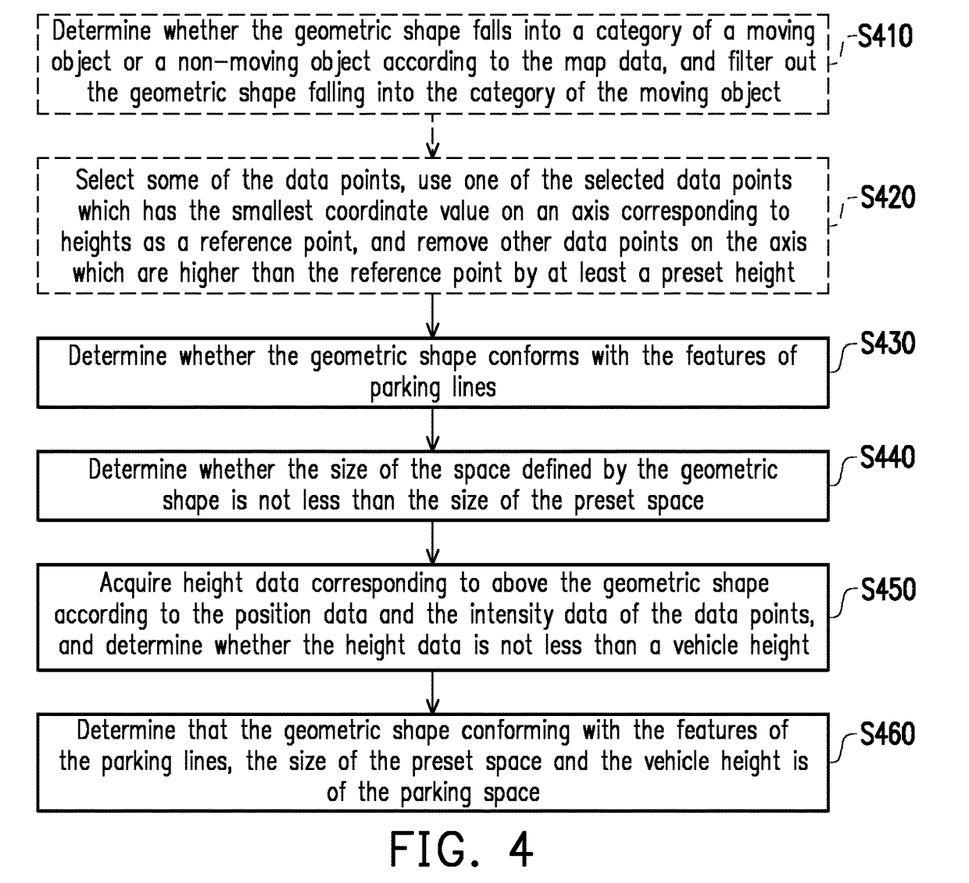
FIG. 4 shows a schematic flowchart of a parking spot detection method according to another embodiment of the present disclosure.

FIG. 4 shows a schematic flowchart of a parking spot detection method according to another embodiment of the present disclosure. The details of determining whether the geometric shape formed by adjacent data points is of the parking space according to the intensity data of the data points by the processing unit 130 of the present disclosure are illustrated in combination with FIG. 4 below.

In step S410, the processing unit 130 determines whether the geometric shape falls into a category of a moving object or a non-moving object according to the map data, and filters out the geometric shape falling into the category of the moving object. In the embodiment of the present disclosure, the map data is previously established and provided by the map database 120. The processing unit 130 further establishes the three-dimensional space according to the position data and the intensity data of the received returned signal. Therefore, by comparing the map data with the three-dimensional space, the processing unit 130 determines that the geometric shape existing in the map data and the three-dimensional space simultaneously is stationary for a long time and falls into a category of the non-moving object. Otherwise, the processing unit 130 determines that the geometric shape only existing in the map data or the geometric shape only existing in the three-dimensional space is the moving object.

In addition, the processing unit 130 further integrates position data and intensity data of a plurality of data points repeatedly acquired in the environment space for a period of time, and performs order reduction processing on the integrated position data and intensity data to filter out the geometric shape falling into the category of the moving object. Specifically, because when the parking spot detection system 100 operates, the vehicle 10 can be in a continuous moving state, in the continuous moving process of the vehicle 10, the detection unit 110 continuously acquires the position data and the intensity data of the data points according to the moving direction of the vehicle 10. At this moment, if the processing unit 130 integrates the position data and the intensity data of the plurality of data points repeatedly acquired in the environment space for a period of time, the data points of the non-moving object are continuously and repeatedly acquired, while the position data and the intensity data of the moving object are only acquired in a part of a period of time, or are distributed in a large area in the environment space. Therefore, after integration for a period of time, the intensity data of the moving object is lower than that of the non-moving object. By virtue of order reduction processing, the processing unit 130 can filter out the geometric shape falling into the category of the moving object.

Because the geometric shape of the parking space falls into the category of the non-moving object, after the geometric shape falling into the category of the moving object is filtered out, the processing unit 130 can reduce the operations and acquire the parking space more accurately. It should be noted that in the method of filtering out the geometric shape falling into the category of the moving object, the processing unit 130 can only adopt the method of comparing the map data with the three-dimensional space, or only adopt the method of integrating the position data and the intensity data of the plurality of data points repeatedly acquired in the environment space for a period of time and performing order reduction processing on the integrated position data and intensity data. The processing unit 130 further can simultaneously adopt the two methods, but the present disclosure is not limited thereto.

In step S420, the processing unit 130 selects some of the data points, uses one of the selected data points which has the smallest coordinate value on an axis corresponding to heights as a reference point, and removes other data points on the axis which are higher than the reference point by at least a preset height. From another point of view, because the axis corresponds to the height, the selected reference point is a data point located on the ground. In the embodiment of the present disclosure, the preset height may be 5 cm, 10 cm, 50 cm, 100 cm, and the like, and the present disclosure does not limit the numerical value of the preset height. If the preset height is 5 cm, the processing unit 130 removes all data points which are high than the reference point by at least 5 cm and retains all data points which are high than the reference point by less than 5 cm. Therefore, the processing unit 130 can retain only the data points on the ground as much as possible to reduce the computational load of the processing unit 130, and the processing unit 130 can also acquire the parking space more accurately. It should be noted that, only based on reduction of the load and misjudgment caused by the computation of the processing unit 130 when acquiring the geometric space, the processing unit 130 logically removes the data points which are high than the reference point by at least the preset height to simplify the operation process. However, after the processing unit 130 determines whether a geometric shape exists, the data points are still continuously applied to judgment of the height of the corresponding geometric shape or other purposes, and the present disclosure is not limited thereto.

It should be noted that, in different embodiments of the present disclosure, step S410 and step S420 can be independently applied or can be simultaneously applied to the parking spot detection system 100 and the parking spot detection method. In addition, in other embodiments of the present disclosure, step S410 and step S420 can also be selectively omitted, and the present disclosure is not limited thereto.

In step S430, the processing unit 130 determines whether the geometric shape conforms with the features of parking lines. In the embodiment of the present disclosure, the features of parking lines include at least one of angles of a parallelogram, edges of the parallelogram and the shape of the parallelogram. For example, if the geometric shape is the same as the angle of the parallelogram, the processing unit 130 determines that the geometric shape conforms with the features of the parking lines. If the geometric shape does not conform to any of the features, the processing unit 130 directly determines that the geometric shape does not be of the parking space.

In step S440, the processing unit 130 determines whether the size of the space defined by the geometric shape is not less than the size of the preset space. In the embodiment of the present disclosure, the size of the preset space is, for example, 2.5 meters wide and 6 meters long; or the size of the preset space may be 4 meters wide and 12 meters long. The size of the preset space is adjusted according to actual needs such as regulations or the size of the vehicle 10, and the present disclosure is not limited thereto. Furthermore, the processing unit 130 determines whether the region defined by the geometric shape is not less than the size of the preset space. If the size of the space defined by the geometric shape is less than the size of the preset space, the processing unit 130 determines that the geometric shape does not be of the parking space.

In other embodiments of the present disclosure, the processing unit 130 determines that the geometric shape conforming with the features of the parking lines and the size of the preset space is of the parking space. However, in the present embodiment, the processing unit 130 continues to perform the following steps.

In step S450, the processing unit 130 acquires height data corresponding to above the geometric shape according to the position data and the intensity data of the data points, and determines whether the height data is not less than a vehicle height. Specifically, after determining that the geometric shape is of the parking space, the processing unit 130 confirms the intensity data of other data points in the corresponding geometric space position from the plane upward, and further determines whether an obstacle exists above the geometric shape according to the intensity data. If the obstacle exists, the height data of the corresponding geometric shape is the height between the plane and the obstacle (namely the effective height of the geometric shape). The vehicle height is the height required for parking of the vehicle 10, such as 1.5 meters. If the processing unit 130 determines that the height data is less than the vehicle height, the processing unit 130 determines that the geometric shape does not be of the parking space.

In step S460, the processing unit 130 determines that the geometric shape conforming with the features of the parking lines, the size of the preset space and the vehicle height is of the parking space. Therefore, the processing unit 130 can further integrate and mark the geometric shape is of the parking space into the map data.

Figure 5:
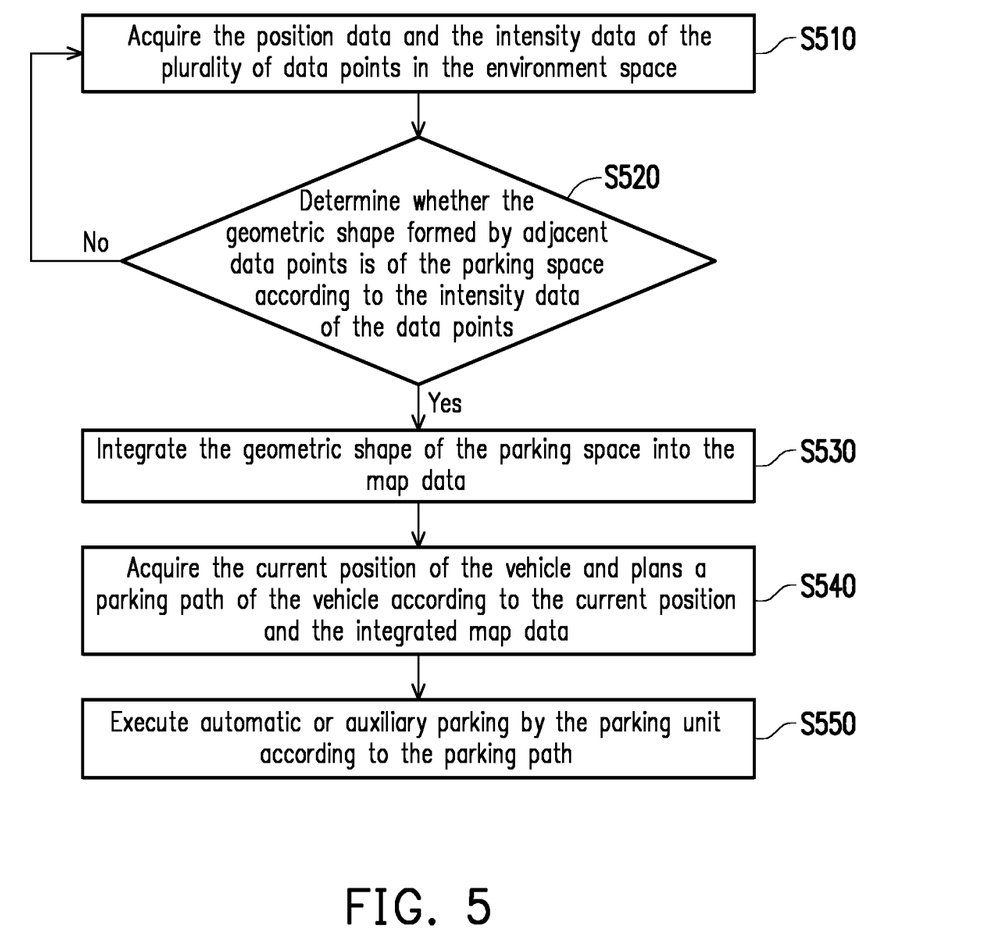
FIG. 5 shows a schematic flowchart of a parking spot detection method according to yet another embodiment of the present disclosure.

FIG. 5 shows a schematic flowchart of a parking spot detection method according to yet another embodiment of the present disclosure. The embodiment in FIG. 5 can be combined with the parking spot detection system 100 and the parking spot detection method in FIG. 1 to FIG. 4. However, in order to avoid repeated description, the operation processes of the parking spot detection method of the present embodiment are illustrated below with reference to FIGS. 1, 2, 3 and FIG. 5.

Referring to FIG. 5, in step S510, the detection unit 110 acquires the position data and the intensity data of the plurality of data points in the environment space. In step S520, the processing unit 130 determines whether the geometric shape formed by adjacent data points is of the parking space according to the intensity data of the data points. In step S530, the processing unit 130 integrates the geometric shape of the parking space into the map data. Steps S510 to step S530 are the same as step S310 to step S330, and details are not described herein again.

In step S540, the processing unit 130 acquires the current position of the vehicle 10 and plans a parking path of the vehicle 10 according to the current position and the integrated map data. In other words, the processing unit 130 can further determine the current position of the vehicle 10 and perform path planning accordingly to generate the parking path. Furthermore, the processing unit 130 can further provide navigation in the integrated map data.

Moreover, in the present embodiment, the parking spot detection system 100 is further provided with a parking unit. For example, the parking unit can be implemented together by a motor, a steering wheel and other machines controlled by a controller coupled to the processing unit 130. The parking unit can be easily understood by those skilled in the art and is not described in detail herein.

In step S550, the parking unit executes automatic or auxiliary parking according to the parking path. The parking unit moves the vehicle 10 to the parking space according to the parking path. Furthermore, in order to ensure safety, the parking unit determines whether other vehicles or obstacles exist in the parking space again. If no vehicle or obstacle exists in the parking space, the parking unit executes automatic or auxiliary parking.

Therefore, the parking spot detection system 100 and the parking spot detection method can integrate the parking space into the map data. Further, the parking spot detection system 100 and the parking spot detection method can provide parking spot navigation and are further applied to automatic or auxiliary parking.

Although the present invention has been disclosed in the above embodiments, it is not intended to limit the present invention. Anyone skilled in the technical field can make some changes and modifications without departing from the spirits and scope of the present invention, so that the protection scope of the present invention is defined by the scope of the appended claims.

What is claimed is:

1. A parking spot detection system, comprising:
    a detection unit, used for emitting a plurality of light signals and acquiring position data and intensity data of a plurality of data points in an environment space according to return of each light signal which is excited in the environment space;
    a map database, used for providing map data; and
    a processing unit, coupled to the detection unit and the map data map database and used for determining whether a geometric shape formed by adjacent data points is of a parking space according to the intensity data of the data points, wherein
    if the geometric shape is determined to be of the parking space, the processing unit further integrates the geometric shape and a position of the parking space into the map data according to the position data of the data points,
    wherein the processing unit further acquires height data corresponding to and above the geometric shape according to the intensity data and the position data of the data points and determines whether the height data is less than a vehicle height, and
    in response to determining that the height data is less than the vehicle height, the processing unit determines that the geometric shape is not the parking space.

2. The parking spot detection system according to claim 1, wherein
    the processing unit further determines whether the geometric shape conforms with features of parking lines,
    the processing unit further determines whether the size of the space defined by the geometric shape is not less than the size of a preset space, and
    the processing unit further determines that the geometric shape conforming with the features of parking lines and the size of the preset space is of the parking space.

3. The parking spot detection system according to claim 2, wherein the features of parking lines comprise at least one of angles of a parallelogram, sides of the parallelogram and the shape of the parallelogram.

4. The parking spot detection system according to claim 2, wherein the processing unit further determines that the geometric shape conforming with the features of parking lines, the size of the preset space and the vehicle height is of the parking space.

5. The parking spot detection system according to claim 1, wherein the processing unit further determines whether the geometric shape falls into a category of a moving object or a non-moving object according to the map data and filters out the geometric shape falls into the category of the moving object.

6. The parking spot detection system according to claim 1, wherein the processing unit further selects some of the data points, uses one of the selected data points which has the smallest coordinate value on an axis corresponding to heights as a reference point, and removes other data points on the axis which are higher than the reference point by at least a preset height.

7. The parking spot detection system according to claim 1, wherein the processing unit further acquires the current position of a vehicle and plans a parking path of the vehicle according to the integrated map data and the current position of the vehicle.

8. The parking spot detection system according to claim 7, further comprising:
    a parking unit, coupled to the processing unit and executing parking according to the parking path.

9. A parking spot detection method, comprising:
    emitting a plurality of light signals and acquiring position data and intensity data of a plurality of data points in an environment space according to return of each light signal which is excited in the environment space;
    determining whether a geometric shape formed by adjacent data points is of a parking space according to the intensity data of the data points;
    if the geometric shape is determined to be of the parking space, integrating the geometric shape and a position of the parking space into map data according to the position data of the data points;
    acquiring height data corresponding to and above the geometric shape according to the intensity data and the position data of the data points;
    determining whether the height data is less than a vehicle height; and
    in response to determining that the height data is less than the vehicle height, determining that the geometric shape is not the parking space.

10. The parking spot detection method according to claim 9, wherein, the step of determining whether the geometric shape formed by the adjacent data points is of the parking space according to the intensity data of the data points further comprises:
    determining whether the geometric shape conforms with the features of parking lines;
    determining whether the size of the space defined by the geometric shape is not less than the size of the preset space; and
    determining that the geometric shape conforming with the features of parking lines and the size of the preset space is of the parking space.

11. The parking spot detection method according to claim 10, wherein the features of parking lines comprise at least one of angles of a parallelogram, edges of the parallelogram and the shape of the parallelogram.

12. The parking spot detection method according to claim 10, further comprising:
   determining that the geometric shape conforming to the features of parking lines, the size of the preset space and the vehicle height is of the parking space.

13. The parking spot detection method according to claim 9, further comprising:
   determining whether the geometric shape falls into a category of a moving object or a non-moving object according to the map data, and filtering out the geometric shape falling into the category of the moving object.

14. The parking spot detection method according to claim 9, further comprising:
   selecting some of the data points; and
   using one of the selected data points which has the smallest coordinate value on an axis corresponding to heights as a reference point, and removing other data points on the axis which are higher than the reference point by at least a preset height.

15. The parking spot detection method according to claim 9, further comprising:
   acquiring current position of a vehicle, and planning a parking path of the vehicle according to the integrated map data and the current position of the vehicle.

16. The parking spot detection method according to claim 15, further comprising:
   executing parking according to the parking path.

* * * * *